United States Patent [19]

Konno et al.

[11] Patent Number: 4,700,039
[45] Date of Patent: Oct. 13, 1987

[54] METHOD AND DEVICE FOR CONTROLLING THE TOOL ELECTRODE IN AN ELECTRICAL DISCHARGE MACHINE TOOL

[75] Inventors: Masanori Konno, Isehara; Kiyoshi Imai, Hiratsuka; Toshihiro Dobashi, Koufu, all of Japan

[73] Assignee: Amada Company, Limited, Japan

[21] Appl. No.: 761,903

[22] Filed: Aug. 2, 1985

[30] Foreign Application Priority Data

| Aug. 8, 1984 [JP] | Japan | 59-164764 |
| Aug. 27, 1984 [JP] | Japan | 59-176634 |
| Aug. 31, 1984 [JP] | Japan | 59-180734 |

[51] Int. Cl.⁴ .......................... B23H 1/02; B23H 7/18
[52] U.S. Cl. ................................. 219/69 G; 219/69 C
[58] Field of Search .................. 219/69 C, 69 G, 69 S

[56] References Cited

U.S. PATENT DOCUMENTS

| 3,370,147 | 2/1968 | Matulaitis | 219/69 G |
| 3,474,216 | 10/1969 | Morgan, Jr. | 219/69 G |
| 3,812,317 | 5/1974 | De Bont et al. | 219/69 C |
| 3,825,715 | 7/1974 | Saito et al. | 219/69 P |
| 3,864,541 | 2/1975 | Inoue | 219/69 C |
| 3,975,607 | 8/1976 | Ullmann et al. | 219/69 G |
| 4,009,361 | 2/1977 | Stanton et al. | 219/69 C |
| 4,039,779 | 8/1977 | Rupert | 219/69 G |
| 4,230,926 | 10/1980 | Gaumond | 219/69 V |
| 4,504,722 | 3/1985 | Kishi et al. | 219/69 P |
| 4,554,428 | 11/1985 | Takawashi et al. | 219/69 C |
| 4,602,142 | 7/1986 | Itoh | 219/69 C |
| 4,608,476 | 8/1986 | Shimizu | 219/69 V |

FOREIGN PATENT DOCUMENTS

| 0071369 | 2/1983 | European Pat. Off. . |
| 2011133 | 6/1969 | United Kingdom . |
| 1323968 | 7/1973 | United Kingdom . |
| 1359122 | 6/1974 | United Kingdom . |
| 1423247 | 2/1976 | United Kingdom . |
| 1494992 | 12/1977 | United Kingdom . |
| 2115585 | 9/1983 | United Kingdom . |
| 2147121 | 5/1985 | United Kingdom . |

*Primary Examiner*—M. H. Paschall
*Assistant Examiner*—Geoffrey S. Evans
*Attorney, Agent, or Firm*—Wigman & Cohen

[57] ABSTRACT

The up and down movement of the tool electrode of an electrical discharge machine is controlled by a circuit arrangement including an electrical discharge condition judgment circuit monitoring the electrical discharge between a tool electrode and a workpiece from the waveform of the discharge and outputting a pulse signal in the event the discharge is abnormal, a motion command circuit which receives and counts the judgment circuit output signal and generates a command signal when the count reaches a set value, and an electrode control circuit responsive to the command signal and causing the tool electrode to move up and down.

1 Claim, 6 Drawing Figures

METHOD AND DEVICE FOR CONTROLLING THE TOOL ELECTRODE IN AN ELECTRICAL DISCHARGE MACHINE TOOL

BACKGROUND OF THE INVENTION

1. Field of the Invention

This invention relates to a method and device for controlling the tool electrode in, for example, an electrical discharge machine tool used for machining workpieces such as steel workpieces; more specifically, to a control device which, when the waveform of the electrical discharge between a tool electrode and workpiece becomes abnormal, is capable of rapidly eliminating the abnormality.

2. Description of the Related Art

Consider, for example, an electrical discharge machine tool which machines workpieces such as steel workpieces. In general, the tool electrode and the workpiece are placed opposite each other, separated by a very small gap, in an electrically insulating dielectric fluid such as kerosene. Voltage pulses are repeatedly applied between the tool electrode and workpiece to machine the workpiece by melting and removing metal from its surface. In this type of electrical discharge machine tool, electrical discharges repeat at the pulse frequency and the tool electrode is gradually submerged inside the workpiece. At this time, if the gap between the tool electrode and the workpiece is too large, an electrical discharge will not take place. Conversely, if the gap is too small, a short circuit will occur. Therefore, the electrical discharge machine tool contains a servomechanism which accurately controls the tool electrode position to insure that the correct gap is maintained between the tool electrode and the workpiece.

In an electrical discharge machine tool as described above, when fine metal waste products removed from the surface of the workpiece by the machining and products of decomposition of the dielectric fluid are present between the tool electrode and the workpiece, the electrical insulation between the tool electrode and the workpiece is reduced and normal discharges do not take place, causing loss of machining accuracy. Consequently, various methods are employed to remove metal waste products from between the tool electrode and the workpiece. For example, when it is possible to open a hole for the dielectric fluid in the tool electrode or the workpiece, dielectric fluid can be ejected or sucked out through the hole. However, when it is not possible to open a hole for the dielectric fluid in the tool electrode or the workpiece, it is necessary to use another method such as strongly injecting the dielectric fluid into the gap between the tool electrode and the workpiece or periodically moving the tool electrode up and down to create a pumping action to remove waste products of the machining from between the tool electrode and the workpiece.

When machining the workpiece to form a dead-end hole such as a hole with a bottom, use of the injection and pumping actions together is effective in removing waste products of machining from the dead-end hole. However, in the method which involves periodically moving the tool electrode up and down, even if the waveform of the electrical discharge between the tool electrode and the workpiece is normal, the need to move the tool electrode up and down unavoidably causes a drop of machining efficiency.

In addition, in an electrical discharge machine tool as described above, the unit distance which the tool electrode is moved in a certain time is kept to a relatively small value to keep the machining process stable, and the motion is slow. Consequently, if, for example, waste products of machining cause a short circuit between the tool electrode and the inside of a deep hole, the tool electrode cannot be pulled away at a high speed, so that a considerable time is required before the short circuit is eliminated. Further, when, as described above, the tool electrode must be pulled back a relatively large distance, considerable additional time is required before the tool electrode can be returned to its original position.

In addition, in an electrical discharge machine tool such as described above, sometimes three-dimensional machining is performed by moving the tool electrode relatively in the X, Y and Z directions with respect to the workpiece. In this type of machining, the tool electrode is controlled based on the main program prestored in a computer control unit which controls the electrical discharge machine tool. Since it is not easy to control the tool electrode through a path that differs from the path in the program while machining is in progress, when it becomes necessary to remove waste products of machining from between the tool electrode and the workpiece or to eliminate a short circuit, all that is done is to move the tool electrode up and down, so that effective pump action cannot be expected in a case such as machining a big hole.

SUMMARY OF THE INVENTION

A purpose of this invention is to provide a method and device for detecting the waveform of the electrical discharge between a tool electrode and a workpiece, judging whether it is normal or abnormal, and moving the tool electrode up and down.

Another purpose of this invention is to provide a method and a device to start the up-down motion of the tool electrode when the tool electrode is at its lowest point during the machining process, and to end the up-down motion when the tool electrode has returned to the lowest point.

To achieve the objectives described above, this invention employs (a) an electrical discharge condition judgment circuit, which judges the condition of the electrical discharge between a tool electrode and workpiece in an electrical discharge machine tool; (b) an electrode up-down action command circuit which commands the up-down motion of the tool electrode corresponding to the output from the electrical discharge condition judgment circuit; (c) an elelectrode control circuit which controls the up-down motion of the tool electrode based on the commands from this electrode up-down action control circuit. In addition, there are (d) a working gap detection circuit which detects when, during the machining process, the tool electrode has reached its lowest point so that the gap between the tool electrode and the workpiece is a minimum, and (e) a peak hold circuit which detects the position of the tool electrode at the start of the up-down motion and stores this information.

Another purpose of this invention is to provide a method for detecting the machining condition between the tool electrode and the workpiece and make it possible to advance or withdraw the machining electrode rapidly and continuously.

In order to achieve this objective, in this invention, when the advance or retreat of the tool electrode has continued for a certain time or a certain number of times the unit distance of the tool electrode motion is adapted to be increased to an upper limit of a preset unit distance of the tool electrode motion.

Still another purpose of this invention is to provide a control method which will move the tool electrode far, when the tool electrode is moved relatively in the X, Y and Z directions with respect to the workpiece based on a main program while performing machining, for the purpose of removing waste products etc. of the machining from between the tool electrode and the workpiece.

To achieve this purpose, in this invention the tool electrode is temporarily moved to a preset point positioned far from the workpiece along the Z-axis, and the tool electrode is moved up and down.

Other and further objects and advantages of the present invention will be apparent from the following description and accompanying drawings which, by way of illustration, show preferred embodiments of the present invention and the principles thereof.

DESCRIPTION OF THE PREFERRED EMBODIMENT

Figure 1:
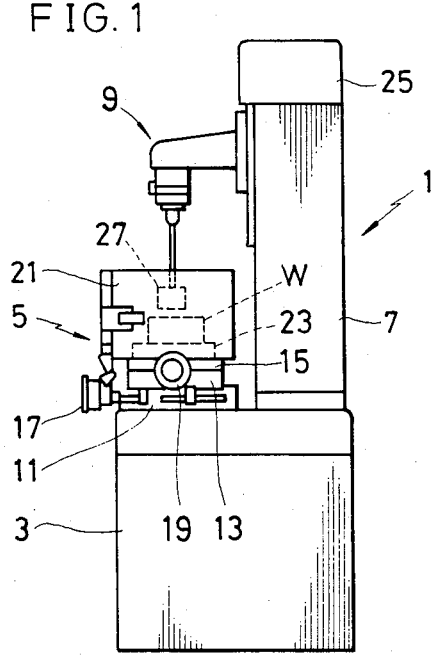
FIG. 1 is a side view showing the basic configuration of an electrical discharge machine tool in which this invention can be incorporated.

Referring to FIG. 1, the electrical discharge machine tool 1 comprises a box-shaped frame 3, an XY cross-table device 5 which is mounted on the base 3, an upright hollow column 7 mounted on the rear of the base 3, and a machining head 9 which is vertically movably mounted on the hollow column 7. The XY cross-table device 5 comprises a Y-axis motion table 13, which is guided by a guide table 11 on the upper surface of the base 3 and is free to move in the Y direction, and an X-axis motion table 15, which is mounted on top of the Y-axis motion table 13 and is free to move in the X direction. The details are not shown in this figure, but the Y-axis motion table 13 is moved in the X direction by a Y-axis servomotor 17 which is mounted on the guide table 11. The X-axis motion table 15 is also moved in the X direction by a X-axis servomotor 19 which is mounted on the Y-axis motion table 13. Mounted on the X-axis motion table 15 is a machining tank 21, inside which is a work table 23 which holes a workpiece W.

The machining head 9 is moved up and down by a servomotor 25 which is mounted on the upper part of the column 7. It has a tool electrode 27, for electrical discharge machining of the workpiece W, which can be freely removed and replaced.

In the above configuration, the tool electrode 27 and the workpiece W are held close to each other, and electrical discharge machining of the workpiece W is performed by electrical discharges which take place between them. At this time, the workpiece is moved under control in the X and Y directions as necessary. In addition, the tool electrode 27 is moved in the Z direction. Consequently, it will be understood that even with an electrode of simple shape, it is possible to perform electrical discharge machining of complicated three-dimensional shapes.

Figure 2:
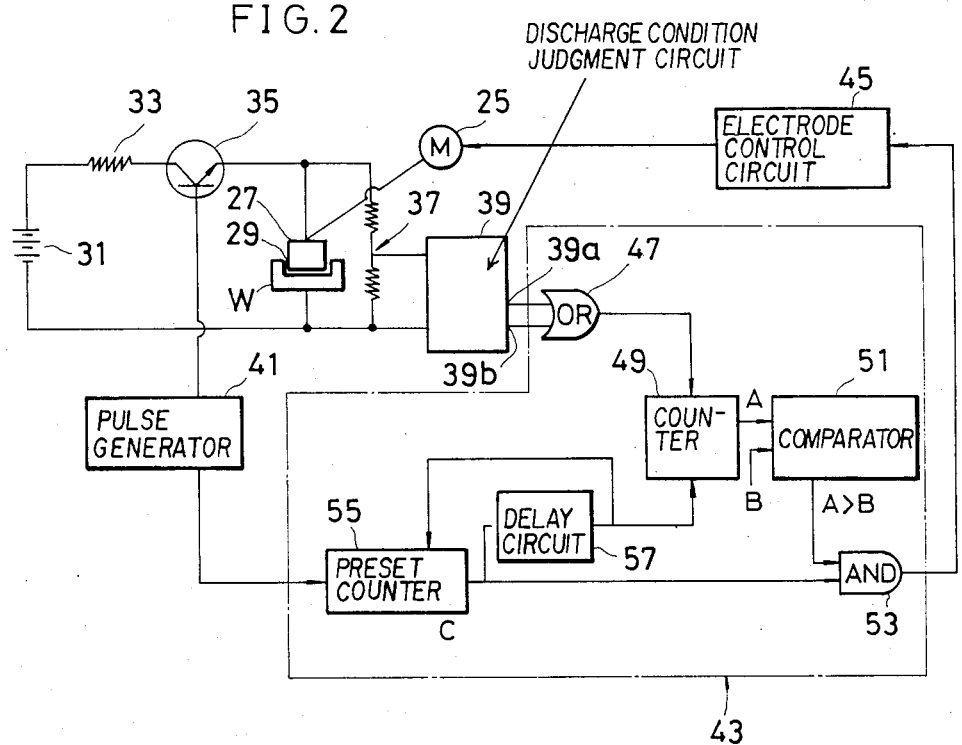
FIG. 2 is a schematic diagram of a first embodiment of this invention.

Referring to FIG. 2, a very small working gap 29 is maintained between the tool electrode 27 and the workpiece W. At both ends of the tool electrode 27 and the workpiece W, a machining power supply 31, a current limiting resistor 33 and a transistor 35 are connected in series. In addition, at both ends of the said tool electrode 27 and the workpiece W, a detection resistor 37 is connected for the purpose of measuring the voltage between the tool electrode 27 and the workpiece W. An appropriate voltage is obtained from this detection resistor 37 by voltage division and fed to the input for an electrical discharge condition judgment circuit 39, which judges the condition of the electrical discharges. Also, connected to the transistor 35 is a pulse generator 41, which controls the ON-OFF action of the transistor 35.

In the configuration described above, when a pulse current is sent from a pulse generator 41 to the transistor 35, ON-OFF action of the transistor 35 corresponding to this pulse current takes place, and an electrical discharge occurs in the discharge gap 29 between the tool electrode 27 and the workpiece W. The discharge voltage waveform in the working gap 29 is detected by the electrical discharge condition judgment circuit 39, and the condition of the electrical discharge is judged. As will be explained in more detail below, the electrical discharge condition judgment circuit permits discrimination among four conditions: no electrical discharge, abnormal electrical discharge, normal electrical discharge and polluted condition. In this embodiment, output of the electrical discharge judgment circuit 39 is used when an abnormal discharge or polluted condition occurs in the working gap 29.

As is shown in FIG. 2, the output from the discharge condition judgment circuit 39 and the output from the pulse generator 41 are connected to an electrode up-down motion command circuit 43, which outputs a signal that commands the tool electrode 27 to move up and down. The output of this electrode up-down motion command circuit 43 is connected to an electrode control circuit 45, which controls the said servomotor 25 to move the tool electrode 27 up or down.

The electrode up-down motion command circuit 43 is comprises mainly of an OR gate 47, counter 49, comparator 51, AND gate 53 and preset counter 55.

In more detail, when an abnormal discharge condition occurs in the working gap 29, that is to say when the insulation condition between the electrodes is not normal, a pulse 39a which indicates that an abnormal discharge condition exists is output. When a polluted condition exists in the working gap 29, a pulse 39b which indicates that a polluted condition exists is produced. These pulses are connected from the discharge condition judgment circuit 39 to the two inputs of the OR gate 47. The output of this OR gate 47 is connected to the counter 49, and the output of the counter 49 is connected to one of the inputs of the comparator 51. The counter 49 counts the number of inputs from the OR gate 47 and outputs the cumulative total A to the comparator 51. The comparator 51 compares the count valve A to a set value B which was preset from another input terminal. When A>B a pulse signal is output. This pulse signal is connected to one input terminal of the AND gate 53; the other input terminal is connected to the output of the preset counter 55. The input of the preset counter 55 is connected to the output of the pulse generator 41. When the cumulative number of pulses input from the pulse generator 41 reaches the set count C, a pulse signal is output to the AND gate 53.

The output of the pulse generator 41 is also connected to the base of the transistor 35. The output of the AND gate 53 is connected to the electrode control circuit 45. This circuit drives the servomotor 25.

In addition, the output of the preset counter 55 is connected to a delay circuit 57. The output of the delay circuit 57 is connected to the counter 49 and the reset input of the preset counter 55.

Figure 3:
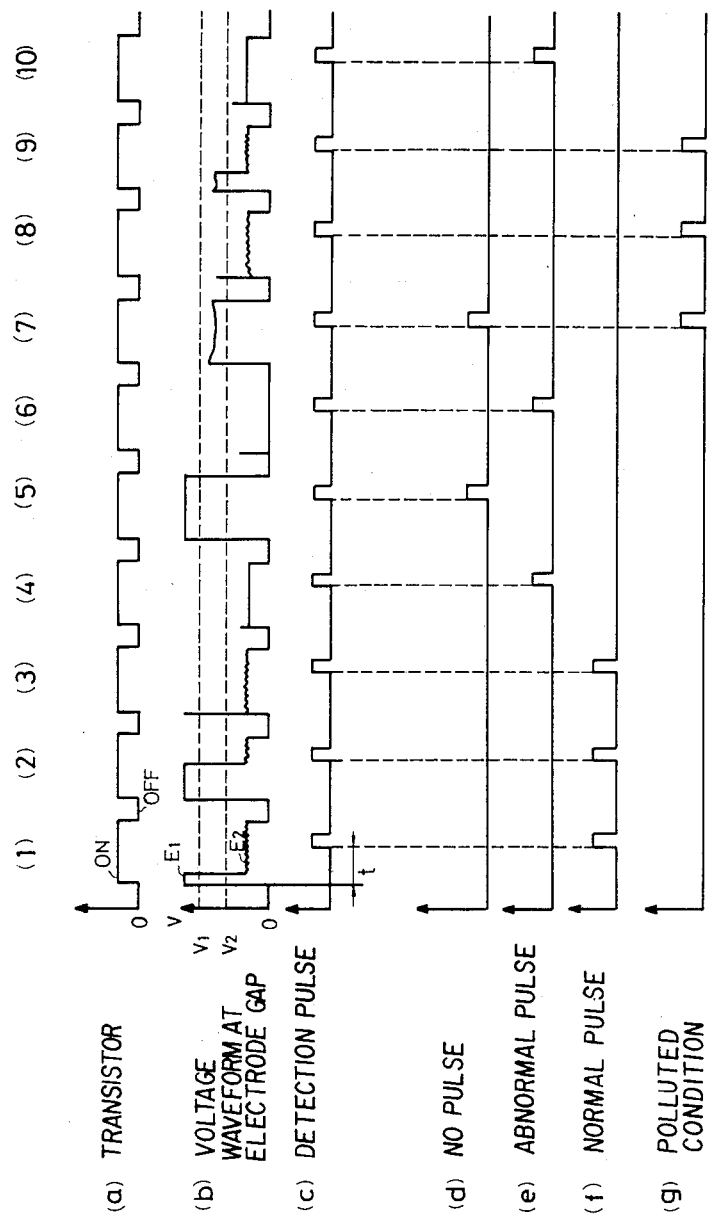
FIG. 3 is an explanatory diagram which shows how the electrical discharge condition is judged.

In the configuration described above, when a current pulse travels from the pulse generator 41 to the transistor 35, the transistor 35, as shown in FIG. 3(a), goes ON or OFF. When transistor 35 goes ON or OFF, the working gap 29 between the tool electrode 27 and the workpiece W synchronizes with the ON-OFF action of the transistor 35 and an electrode discharge takes place, with one of several possible voltage waveforms, depending on the condition between the electrodes, as shown in FIG. 3(b).

The discharge condition judgment circuit 39 compares the voltage level $E_1$ at the leading edge of the pulse applied between the electrodes and the voltage level $E_2$ upon oscillation of a detection pulse, time t later than the leading edge, with the two reference voltage levels $V_1$ and $V_2$, and thus, as shown in FIGS. 3(d) through (g), discriminates among the four conditions of no pulse, abnormal pulse, normal pulse and polluted condition.

Specifically, when the voltage level $E_1$ at the leading edge of the pulse applied between the electrodes is larger than the reference voltage level $V_1$, and in addition the voltage level $E_2$ is smaller than the reference voltage level $V_2$, the discharge is judged to be normal. When the voltage level $E_1$ at the leading edge of the said applied voltage pulse and the said voltage level $E_2$ are both smaller than the reference voltage level $V_2$, it means that the insulation in the gap between the electrodes has dropped, and the condition of the discharge is judged to be abnormal. When the voltage level $E_1$ at the leading edge of the said applied pulse and the said voltage level $E_2$ are both larger than the reference voltage $V_1$, the gap between the electrodes is too large and it is judged that no discharge is taking place. When the voltage level $E_1$ at the leading edge of the applied pulse is of magnitude between $V_1$ and $V_2$, there is not sufficient insulation between the electrodes and a polluted condition is judged to exist due to waste products of machining in the gap between the electrodes.

When an abnormal pulse condition or polluted condition exists, there are waste products of machining in the gap between the electrodes, causing the insulation to be inadequate, so it is necessary to remove the waste products.

Consequently, when the discharge condition judgment circuit 39 detects a waveform which indicates an abnormal discharge or a polluted condition, and output pulses 39a and 39b are output to the OR gate 47, all pulses of both types are input from the OR gate 47 to the counter 49, and the number of the pulses is counted by the counter 49. The cumulative count value A counted by the counter 49 is output to the comparator 51. In the counter 51 the cumulative count value A is compared to the set value of B. When A>B a pulse signal is output from the comparator 51 to the AND gate 53.

Meanwhile, when the number of pulses from the pulse generator reaches the count value C set in the preset counter 55, a pulse signal is input from the preset counter 55 to the AND gate 53. At the same time, a pulse signal which resets the counter 49 and the preset counter 55 is input through the delay circuit 57. Consequently, if the total number of abnormal discharge condition waveform pulses and polluted condition waveform pulses reaches a fixed value within a certain time, pulse inputs enter both of the input terminals of the AND gate 53, and a pulse signal is output from the AND gate 53 to the electrode control circuit 45. The electrode control circuit 45 in turn controls the servomotor 25, causing the tool electrode 27 to move up or down by an appropriate amount. This creates a pumping action between the tool electrode 27 and the workpiece W, removing waste products from the working gap 29 and making it possible for normal discharges to occur.

Figure 4:
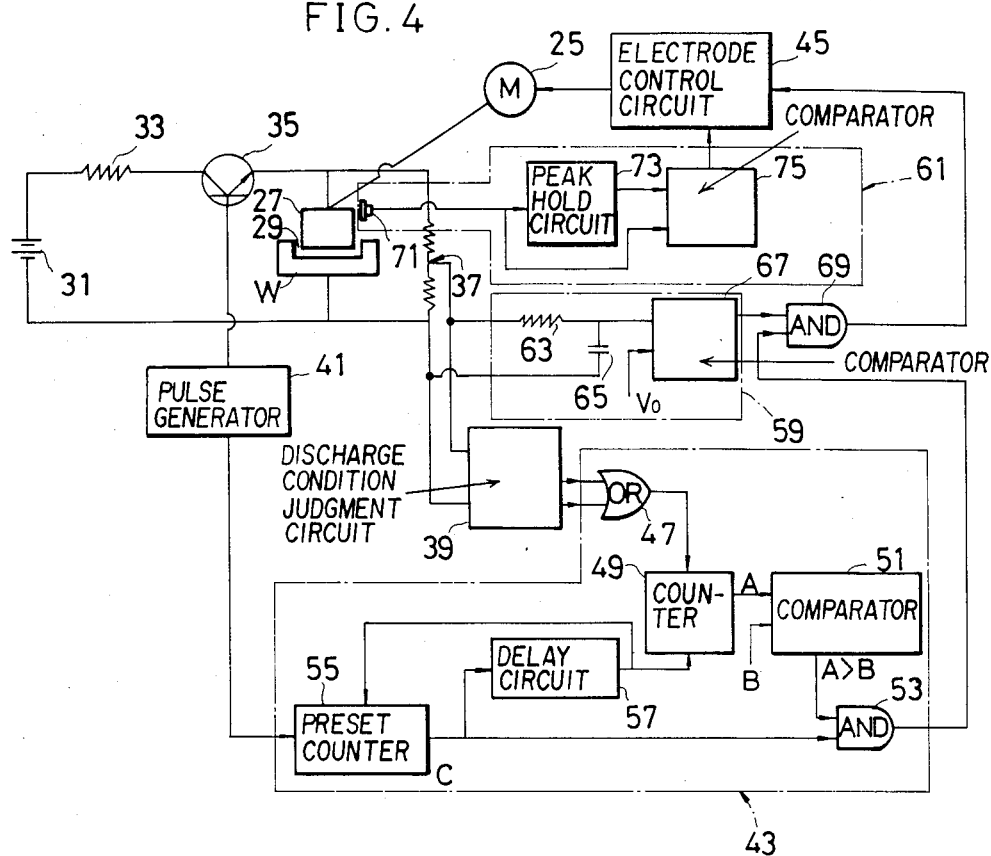
FIG. 4 is a schematic diagram of a second embodiment of this invention.

FIG. 4 shows a second embodiment of this invention. It is the embodiment shown in FIG. 2 with the addition of a working gap detection circuit 59 and a tool electrode setting circuit 61 which sets the position of the end of the up-down movement of the tool electrode 27 to the lowest point reached in the electrical discharge machining process.

The working gap detection circuit 59 has a resister 63, a capacitor 65 and a comparator 67 which compares the voltage $V_3$ produced by averaging the voltage obtained by voltage division with the detection resistor 37, the averaging being done by the averaging resistor 63 and the capacitor 65, with the set voltage $V_0$ which corresponds to the time when the working gap 29 is a minimum. When the two are equal, the comparator 67 outputs a pulse signal. The output of the comparator 67 is connected to one of the inputs of the AND gate 69. The output of the AND gear 53 is connected to the other input of this AND gate 69. The output of this AND gate 69 is connected to the electrode control circuit 45.

In the configuration described above, the up-down motion of the tool electrode 27 starts when the tool electrode 27 is at its lowest point during the machining process. This means that the pumping effect created by the up-down motion of the tool electrode 27 will be large. Accordingly, the working gap 29 is cleaned rapidly.

The tool electrode setting circuit 61 has a linear scale 71 which detects the present position of the tool electrode 27, a peak hold circuit 73 which stores the lowest position of the tool electrode 27 in memory among the position detection siganls from the linear scale 71 during the electrical discharge machining process, and a comparator 75 which compares the input value from the peak hold circuit 73 with the input value from the linear scale 71 which indicates the present position of the tool electrode 27. When the two agree, the comparator 75 outputs a stop signal to the electrode control circuit 45. That is to say, in this configuration the tool electrode 27, which is moved up and down to create pumping action, is stopped at the lowest point reached during the machining process. This insures that the pumping effect created by the up-down motion of the tool electrode 27 will be large, so that the working gap 29 is cleaned out rapidly, and at the same time it is easy to start the subsequent electrical discharge machining.

As explained above, when the working gap 29 between the tool electrode 27 and the workpiece W is polluted by waste products from machining, the working gap 29 can be cleaned by moving the tool electrode up and down with respect to the workpiece W. After the working gap 29 has been cleaned in this way, electrical discharge machining is started again. By gradually advancing the tool electrode 27 in the direction of the workpiece W, electrical discharge mcahining is performed. However, in order for electrical discharge machining to be performed efficiently, it is necessary for the tool electrode 27 to be controlled as it goes through various actions such as advancing, stopping and retreating corresponding to the electric discharge condition of the working gap 29. In this case, if the advance or retreat of the tool electrode 27 continues over a certain time or over a certain number, if the unit distance which the tool electrode 27 is moved by each command from the computer control device remains fixed, it becomes difficult to move it quickly.

Therefore, in this embodiment, there is a means such that when advance or retreat commands for the tool electrode 27 continue, the unit distance which the tool electrode 27 moves is increased within a preset limit to move the tool electrode 27 quickly.

Figure 5:
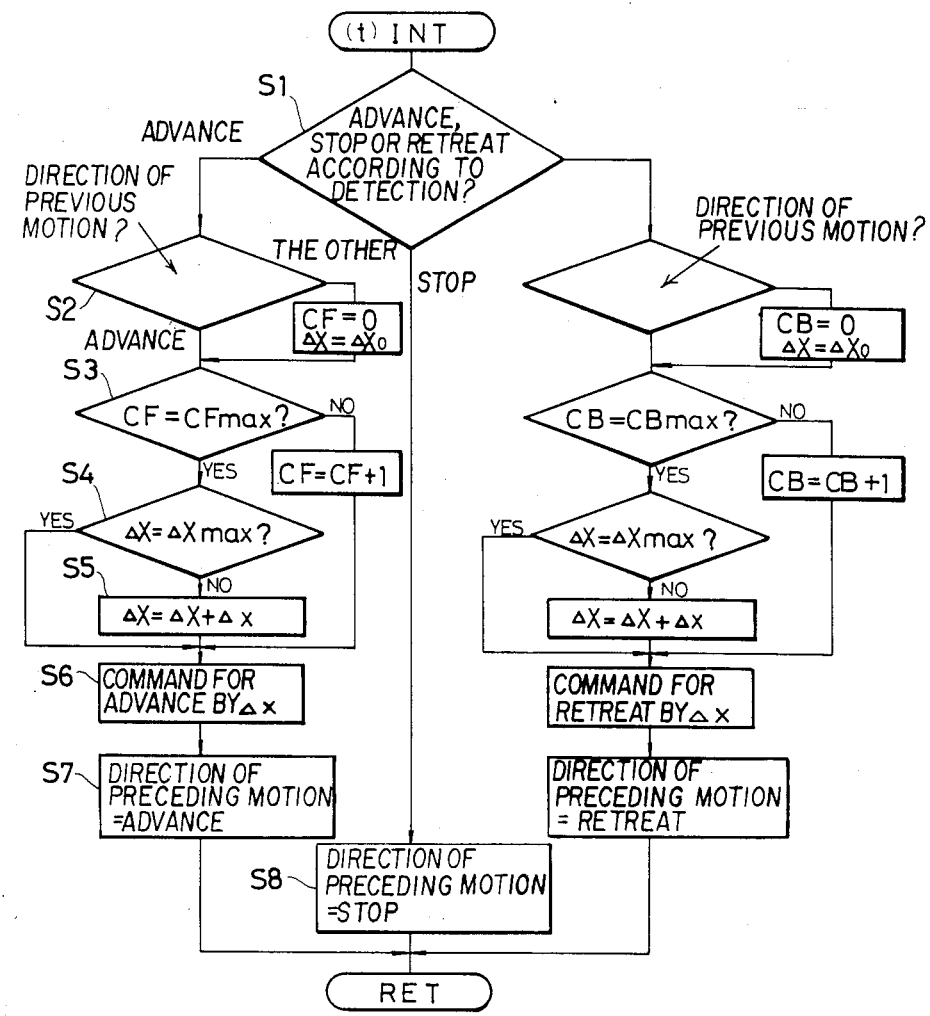
FIG. 5 is an example of an interrupt flow chart when a computer is used in an embodiment of this invention.

In more detail, when the electrical discharge machine tool is controlled by a computer, and interruptions to the main program occur and a motion command calculation program is started on a regular cycle, processing proceeds according to the flow chart shown in FIG. 5.

In step s1, based on the result of the immediately preceding machining condition detection, it is judged whether the next command should be an advance, a stop or a retreat.

When it is judged that the next step should be an advance, in step S2 it is investigated whether the previous motion command was for an advance or a retreat. If it was other than an advance (either a stop or a retreat), then the current advance is not a continuation, so the number of continuous advances counter CF is cleared and the unit distance $\Delta X$ is set to the inital value $\Delta X_0$.

If the preceding motion command was for an advance, then in step S3 it is investigated whether the number of continuous advances counter CF has reached the set value $CF_{max}$. If the counter CF has not reached the set value $CF_{max}$, the counter CF is incremented by 1 and the unit distance $\Delta X$ is not changed. If the counter CF has reached the set value $CF_{max}$, it is judged that the advance commands have continued for the set time.

In this case, in step S4 it is investigated whether or not the unit distance $\Delta X$ has reached its maximum value $\Delta X_{max}$. If the maximum value $\Delta X_{max}$ has been reached, then the unit distance is not increased. If the maximum value $\Delta X_{max}$ has not been reached, then in step S5 the unit distance $\Delta X$ is increased by the set value $\Delta x$.

In step S6 a command for an advance by the unit distacne X is output.

In step S7 a flag which indicates the direction of the preceding motion command is set.

If, in the step S1, it is judged that the next command should be for a stop, then in step S8 the flag which indicates the direction of the preceding movement is set to stop.

If, the step S1, it is judged that the next command should be for a retreat, then processing proceeds in a manner analogous to the case of an advance. That is to say, it is investigated whether the preceding motion command was for an advance or a retreat; if it was not a retreat then the number of continuous retreats counter CB is cleared, and the unit distance $\Delta X$ is set to the inital value $\Delta X_0$. If the preceding motion command was for a retreat, it is investigated whether or not the number of continuous retreats counter CB has reached the set value $CB_{max}$. If the counter CB has reached the set value $CB_{max}$, the unit distance $\Delta X$ is increased by the set value $\Delta X$. On the other hand, if the unit distance $\Delta X$ has reached its maximum value $\Delta X_{max}$ then it is not increased. If the counter CB has not reached the set value $CB_{max}$, the counter CB is incremented by 1 and the unit distance $\Delta X$ is not changed. Next, a command for retreat by the unit distance $\Delta X$ is output, and the flag indicating the direction of motion is set to retreat.

Thus, when the machining condition in the working gap is normal the unit distance is small while if it is abnormal it is possible, for example by continuation of retreat commands, to control the motion of the tool electrode so that it is moved a large distance. Consequently, when an abnormal condition such as a short circuit occurs during electrical discharge machining, the abnormal condition can be removed rapidly by increasing the speed of motion of the tool electrode.

Figure 6:
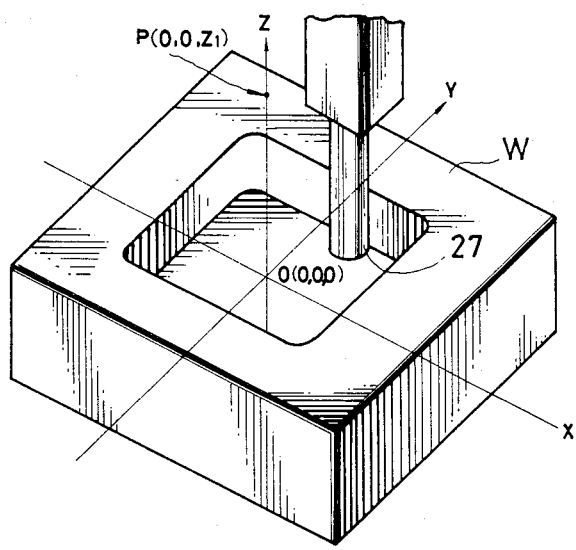
FIG. 6 is a perspective view used to explain how the tool is moved in this invention.

Referring to FIG. 6, when electrical discharge machining of a complicated shape is performed by moving a tool electrode 27 of simple shape which is installed in an electrical discharge machine tool in the X, Y and Z directions with respect to the workpiece W, the position of the tool electrode 27 is controlled by a computer. The path of the tool electrode 27 and other conditions are programmed in advance, and in addition a target position called "runaway point" is preset; no matter where the tool electrode 27 is located it can be moved quickly to and from the runaway point at a preset speed either along a straight line in space or by independent movements in the three coordinate directions. Commands for round-trip movement of the tool electrode 27 to and from the runaway point can for example be given at fixed intervals. Also, the back-and-forth motion of the tool electrode can be triggered automatically based on the result of detection of the condition of the electrical discharge in the working gap between the tool electrode 27 and the workpiece W, thereby improving machining efficiency.

In this embodiment, the program coordinates are designated X, Y and Z and the runaway point is set at point P (0, 0, $Z_1$) on the Z-axis. As the electrical discharge machining progresses, if the direction of back-and-forth motion of the tool electrode 27 changes, the position of the runaway point is changed in the program.

Also, depending on the shape to which the workpiece W is being machined, it sometimes happens that there will be an obstacle between the tool electrode 27 and the runaway point. In this case, when the back-and-forth motion of the tool electrode 27 is started by a command, it retreats along its path by a distance which is present in the program and then it travels to and from the runaway point. In this way a collision between the tool electrode 27 and the obstacle is avoided.

That is to say, when electrical discharge machining of a complicated shape is done by moving the tool electrode 27 in the X, Y and Z directions with respect to the workpiece W, when a command is given for the tool electrode 27 to move back and forth, the tool electrode 27 moves to and from a runaway point which is spaced from the workpiece W. Consequently, the tool electrode 27 moves a considerable distance and stirs up considerable movement of the dielectric fluid, removing the waste products of machining from the working gap. Accordingly, there will be few occurrences of abnormal electrical discharges between the tool electrode and the workpiece, improving the machining efficiency.

Although a preferred form of the present invention has been illustrated and described, it should be understood that the device is capable of modification by one skilled in the art without departing from the principles of the invention. Accordingly, the scope of the invention is to be limited only by the claims appended hereto.

What is claimed is:

1. A tool electrode control device in an electrical discharge machine tool comprising:
   (a) an electrical discharge condition judgment circuit for monitoring the electrical discharge between a tool electrode and a workpiece from the waveform of the electrical discharge by detecting a first voltage level at the leading edge of the discharge pulse and a second voltage level subsequently during the discharge pulse and comparing the first detected voltage to a first reference voltage level and the second detected voltage to a second reference voltage level, said electrical discharge condition judgment circuit outputting pulse signals $S_1$ and $S_2$ both of which indicate that the waveform of the electrical discharge between the tool electrode and the workpiece is abnormal,
   said pulse signal $S_1$ is output when $E_1$ and $E_2 < V_2$ is detected and said pulse signals $S_2$ is output when condition $V_2 < E_1 < V_1$ is detected where
   $E_1$ = first detected voltage,
   $E_2$ = second detected voltage,
   $V_1$ = first reference voltage, and
   $V_2$ = second reference voltage;
   (b) an electrode up-down motion command circuit receiving the judgment circuit pulse signal and which outputs a pulse command signal instructing the tool electrode to move up and down when the number of said judgment circuit pulse signals reaches a set value;
   (i) an OR gate receiving said pulse signals $S_1$ and $S_2$, and outputting a pulse signal when actually receiving either one of said pulse signals $S_1$ and $S_2$,
   (ii) a counter receiving the pulse signal from the OR gate, counting the number of the pulse signals and outputting a cumulative count value,
   (iii) a comparator receiving the cumulative count value from the counter, comparing the cumulative count value to a prescribed set value and outputting a pulse signal when the cumulative count value becomes greater than the prescribed set value,
   (iv) a preset counter counting the number of pulse signal output from a pulse generator which controls the ON-OFF action of the switching device that controls the discharge current supplied to the working gap,
   the preset counter outputting a pulse signal when the cumulative count becomes greater than the preset value,
   (v) a delay circuit receiving the pulse signal from the preset counter, and resetting said counter and said preset counter after a specified time elapsed from the time when receiving the pulse signal from the preset counter,
   (vi) an AND gate receiving the pulse signals from said comparator and from said preset counter, and outputting the pulse command signal instructing the tool electrode to move up and down when actually receiving the both pulse signals at its input terminals; and
   (c) an electrode control circuit which receives the pulse signals from the electrode up-down motion command circuit and causes the tool electrode to move up and down.

* * * * *